United States Patent [19]
Tominaga

[11] Patent Number: 5,678,103
[45] Date of Patent: Oct. 14, 1997

[54] CAMERA WITH BUILT-IN MASK

[75] Inventor: Yasunori Tominaga, Tokyo, Japan

[73] Assignee: Toyo Hybrid Co., Ltd., Mitaka, Japan

[21] Appl. No.: 619,039

[22] Filed: Mar. 20, 1996

[30] Foreign Application Priority Data

Mar. 23, 1995 [JP] Japan ................................ 7-90245

[51] Int. Cl.⁶ .................................................. G03B 11/00
[52] U.S. Cl. ........................ 396/435; 396/360; 396/544; 396/545
[58] Field of Search ................................ 354/295, 296; 396/380, 435, 544, 545

[56] References Cited

U.S. PATENT DOCUMENTS

| | | | |
|---|---|---|---|
| 1,572,315 | 2/1926 | Scholl | 354/296 |
| 3,987,461 | 10/1976 | Kondo | 354/295 |
| 4,124,859 | 11/1978 | Huber | 354/296 |
| 4,126,878 | 11/1978 | Steiner | 354/296 |
| 4,137,540 | 1/1979 | Curtis | 354/296 |
| 4,304,471 | 12/1981 | Jones | 354/296 |
| 4,506,964 | 3/1985 | Hayles | 354/296 |
| 5,038,161 | 8/1991 | Ki | 354/295 |
| 5,119,118 | 6/1992 | Harada et al. | 354/106 |
| 5,349,411 | 9/1994 | Beauviala | 354/295 |

Primary Examiner—Safet Metjahic
Assistant Examiner—Michael Dalakis
Attorney, Agent, or Firm—Hoffmann & Baron, LLP

[57] ABSTRACT

A camera with a built-in mask comprising a mask that is mounted on the optical axis between an imaging lens and the plane of a film, whereby photographing is performed by light cutting or light filtering the mask image of a pattern or a symbol in a manner that the image of an object is partially converted with the mask image.

9 Claims, 3 Drawing Sheets

CAMERA WITH BUILT-IN MASK

BACKGROUND OF THE INVENTION

1. Field of the Invention

The present invention relates to a camera with a built-in mask which provides a pattern or a symbol to the image of an object by mounting a built-in mask in front of a film plane.

2. Description of the Related Art

Some cameras are known to mask an exposure area in front of the film. For example, Japanese Laid-open Patent Application No. Hei-2-178643 has disclosed a camera which comprises a pivotally mounted light-cutting sheet for switching the image size for a half size or full size. Japanese Laid-open Utility Model Application No. Shou-57-119331 has disclosed a camera having a built-in masking member in the camera body, wherein half-size photographing is performed by light-cutting a half of the exposure area of the camera by manipulating an external rotary knob or a double exposure as a photographing technique is performed by switching light-cutting area. Furthermore, Japanese Laid-open Utility Model Application No. Shou-64-43338 has disclosed a camera that photographs the initials of an individual written on a sheet, not by light cutting, but by CPU signal processing which controls an LED to emit light in synchronism with film takeup position.

The above-described cameras that perform light-cutting restrict simply the exposure area, and do not suggest any idea that light-cutting is used to develop a pattern or a symbol on an image. The above-described camera that photographs the initials receives information, but does not suggest the idea that a pattern or the like is developed on the image. Furthermore, the construction of the camera is complicated.

SUMMARY OF THE INVENTION

It is an object of the present invention to provide a camera that superimposes the mask image of a pattern or a symbol onto the image of an object by means of a simple structure that light cuts or light filters the imaging light in front of a film plane.

To achieve the above object, the present invention comprises a mask that is mounted behind an imaging lens and in front of a film plane on the optical axis of the imaging lens, in which photographing is performed by light cutting or light filtering the mask image of at least one of a pattern and a symbol in a manner that the mask image is superimposed onto the image of the object.

The mask superimposes on the imaging light from the imaging lens a mask image of patterns such as cuts, marks and the like, or symbols such as characters, codes and the like, formed by the shape of the light-cutting member, or a mask image of patterns or symbols colored or not-colored through light-filtering. Superimposed images are then projected onto a film. The image of the object is partly changed or partly filtered, and the mask image is thus photographed.

According to the present invention, the mask image is easily superimposed onto the image of the object by means of a light-cutting or a light-filtering mask. Mask images are typically patterns or symbols, such as cuts or a company's logo, and characters or drawings conveying information about the photographed image. In photographing, a viewfinder allows a photographer to check the relative position of the image of the object to the pattern or symbol.

DETAILED DESCRIPTION OF THE PREFERRED EMBODIMENTS

Figure 1:
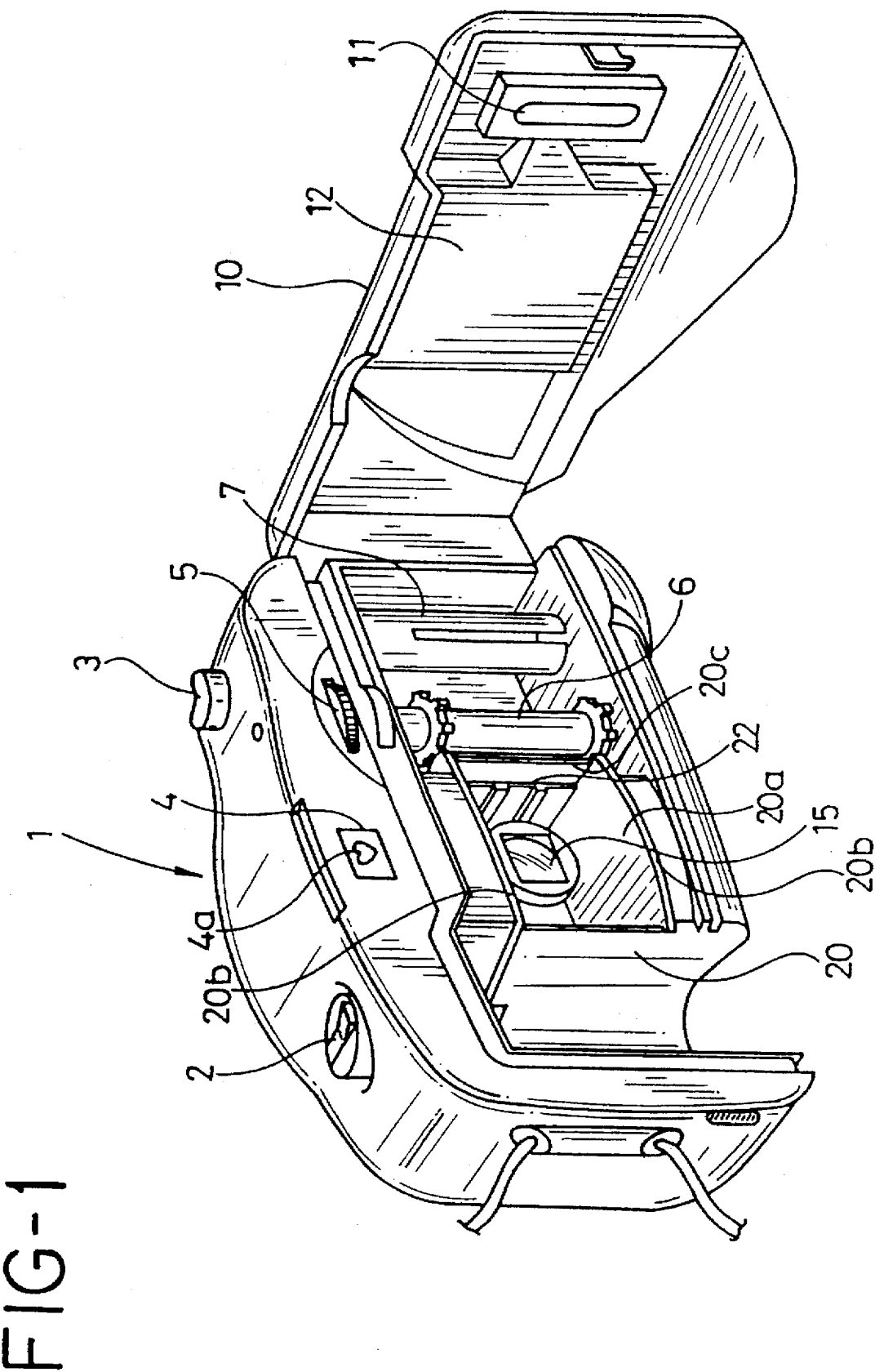
FIG. 1 is a perspective view showing a camera with a built-in mask according to an embodiment of the present invention.
Figure 2:
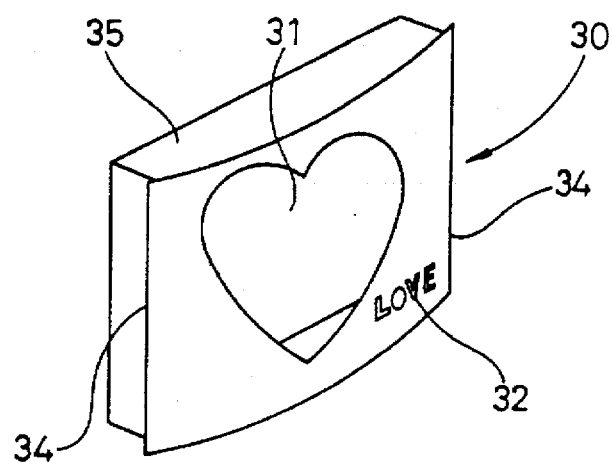
FIG. 2 is a perspective view of the mask of the camera.
Figure 3:
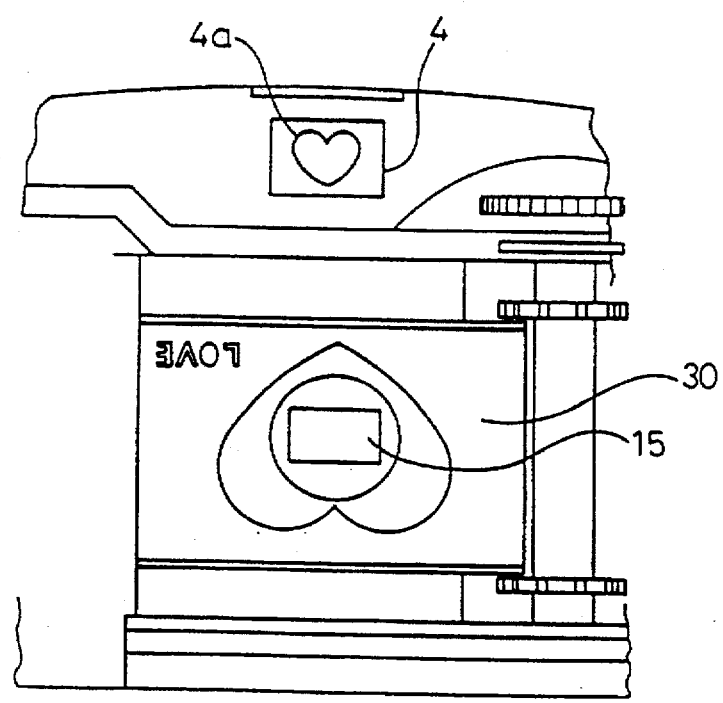
FIG. 3 is a rear view showing the major portion of the camera with the mask set.

Referring now to FIGS. 1 through 3, the camera with the mask according to one embodiment of the present invention is discussed. Shown in FIG. 1 is a film-integrated, inexpensive camera 1 that is in widespread use today as used-up camera, which comprises a rewind lever 2 for a film cartridge mounted inside the camera body, a shutter button 3, a viewfinder 4, a film takeup rotary disk 5, and a sprocket 6 for causing a film takeup spool 7 to wind up the film. Designated 10 is a camera body rear cover which is provided with a film pressure plate 12 on its center and a cartridge monitoring window 11 on its side. An hollow exposure frame 20 sized to the exposure area on the optical axis is formed around an imaging lens 15. The film that is set by the film takeup rotary disk 5 is exposed in the opening 20a of the exposure frame 20.

FIG. 2 shows the mask 30 produced by the light-cutting sheet according to the present invention. A cutout portion 31 is formed by cutting out a heart from the sheet corresponding to the center of the exposure area of the imaging lens 15. In the rest of the exposure area, a word 32 is cut out. As a locking member to be engaged with the opening 20a, a mounting frame 35 is formed around the periphery of the planar front of the mask 30 and is extended rearwardly from the periphery of the mask 30. The mask 30 is also provided with flange portions 34 on both sides. The top and bottom edges 20b of the opening 20a are slightly projected and the exposure frame 20 has steps 22 in its inside, so that these constitute a socket for the mask 30. The mask 30 is set between the edges 20b, with the mounting frame 35 received within the exposure frame 20, with the end of the mounting frame 35 abutting the steps 22, and with both flange portions 34 abutting the side edges 20c of the opening 20a. The mask 20 is thus detachably engaged with the opening 20a of the exposure frame 20. The lens of the viewfinder 4 gives a line pattern 4a colored correspondingly to the heart-shaped cutout portion 31 so that a photographer can check the relative position of the mask image to be superimposed onto the image of the object.

When the camera is loaded with the film cartridge, the mask 30 is set into the opening 20 as desired (reference is made to FIG. 3). The exposure area is thus light cut by the heart shape in front of the film, and thus the heart-shape mask image is superimposed onto the image of the object. The photographer can beforehand check the area of the object within the heart shape by referring to the line pattern 4a within the viewfinder 4. The heart-shape pattern can thus be superimposed on all pictures of a full roll of film, possibly as souvenir pictures.

Figure 4:
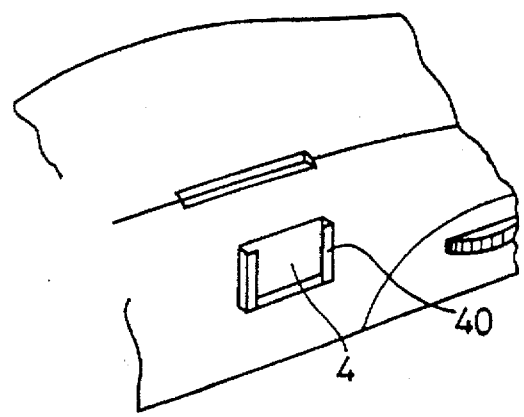
FIG. 4 is a perspective view of the major portion of the embodiment of the present invention in connection with the viewfinder of the camera.

A plurality of masks with different cutout portions may be prepared in a set, and during film loading, any one from the set may be selected as desired. As shown in FIG. 4, an socket 40 with L-shaped side flanges is attached around the viewfinder 4. Detachably received in the socket 40 is a square mask-like chip bearing cutout patterns or cutout symbols in the light-cutting sheet corresponding to the patterns or symbols of the mask or, a transparent sheet bearing line or planar patterns or symbols. If the camera is an inexpensive model, the mask may be permanently attached in front of the film. In this case, the mask image is usually superimposed.

Figure 5:
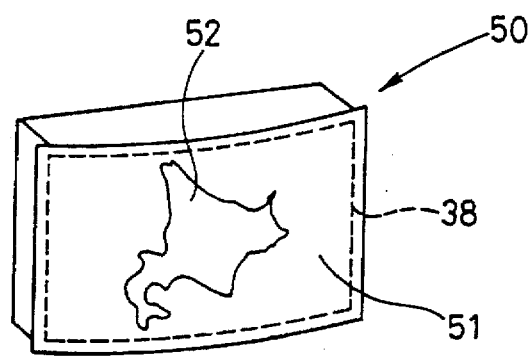
FIG. 5 is a perspective view showing another embodiment of the mask.

FIG. 5 shows another embodiment of the mask. A mask 50 is made by cutting out largely its planer front, identical to that of the mask 30, with a square outline 38 only left, and a film-like filter 51 is glued. The filter may be formed as a coloring filter by grading entirely any geographic area, for example, Hokkaido in this case, to pink as a pattern 52 with the remaining area left transparent. With the mask 50 set in the camera, for example, during a travel around in Hokkaido, the pink Hokkaido region is superimposed on the image of the object with no part of the image of the object hidden.

The filter may be graded to one single color or may be a foggy filter with non-colored patterns, or may bear patterns of colored lines or color-fill areas or colored symbols. The filter may be partially cut out in the same way the light-cutting cutting sheet is cut off, and the non-cut area of the filter may be used as a filter.

Figure 6:
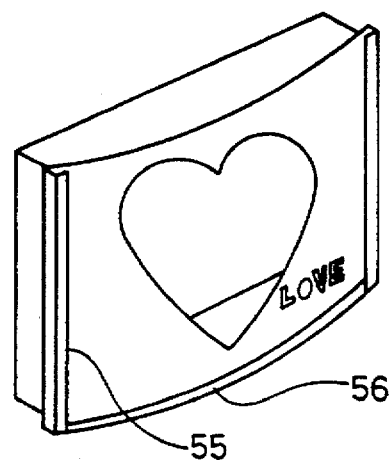
FIG. 6 is a perspective view showing yet another embodiment of the mask.

FIG. 6 shows yet another embodiment of the mask. In FIG. 6, the mask 30 of FIG. 1 is positioned slightly forward with the depth dimension of the exposure frame 20 slightly reduced. Furthermore, the mask 30 is provided, on its sides and bottom edge around the periphery of its planer front, with a socket 55 constructed of L-shaped side flanges and a bottom flange 56. A plurality of different coloring filters glued onto square sheets are prepared, and any desired filter may be fitted into the socket 55 to grade the heart shape to any color at the option of the photographer. In this way, double masking may be a combination of diversity of filters and light-cutting masks of a diversity of cutout portions including the heart shape.

The double masks may be constructed of two filters. For example, a pattern and letters may be cut off from one filter and the same pattern at the same position as the first filter may be cut off from the other filter which is transparent. Different letters having different meaning at different position from the first filter are cut off from the second transparent filter to form a coloring filter there. Such double masks may be of fixed type. Alternatively, the double masks may be a unitary filter that is detachably mounted in the socket as shown in FIG. 6. Alternatively, a socket may be constituted by a frame locking member formed around the exposure area and a frame locking member formed around the filter, and both frame locking members are engaged in a detachable manner when the double masks are mounted.

What is claimed is:

1. A camera with a built-in mask in which an imaging lens is mounted in the front portion of the body of the camera and a film is positioned behind the imaging lens on the optical axis of the imaging lens, and wherein an exposure frame is formed around said imaging lens, said exposure frame defining an exposure opening, said camera comprising a mask that is mounted in the optical axis between the imaging lens and the plane of the film, said mask being carried by a mounting frame dimensioned to detachably engage with said exposure opening of said exposure frame, said mask being constructed of a light-cutting sheet having a central cut-out portion defining a mask image whereby photographing is performed by light cutting the mask image in a manner that the mask image is superimposed onto the image of an object, and wherein a viewfinder is mounted on the camera body, said viewfinder including a socket therearound whereby the socket detachably receives a mask-like chip bearing a mask pattern or symbol corresponding to that of the mask so that the relative position of the mask image superimposed onto the image of the object is checked.

2. The camera with a built in mask according to claim 1, wherein the cut out central portion of the mask is of a non-square shape to cut off light on the periphery of the cutout portion.

3. The camera with a built-in mask according to claim 2, wherein the portion of the light-cutting sheet that cuts off light in the periphery of the exposure area is further partially cut away.

4. The camera with a built in mask according to claim 1, further comprising a socket formed around said exposure opening, and wherein the mask is provided, along the periphery of the planar front of the mask, with a locking member that is detachably engaged with the socket.

5. The camera with a built-in mask according to claim 2, wherein a filter is provided behind or in front of the mask so that the mask image is further photographed in the cutout portion of the light-cutting sheet.

6. The camera with a built-in mask according to claim 1, wherein the pattern or the symbol corresponding to the mask is attached to the lens of a viewfinder mounted on the camera body so that the relative position of the mask image superimposed onto the image of the object is checked.

7. A camera with a built-in mask according to claim 1, wherein the mask-like chip is a light-cutting sheet.

8. A camera with a built-in mask according to claim 1, wherein the mask-like chip is a transparent sheet.

9. A camera with a built-in mask according to claim 1, wherein the mask-like chip is square.

* * * * *